United States Patent
Ahn et al.

(10) Patent No.: US 9,769,822 B2
(45) Date of Patent: Sep. 19, 2017

(54) METHOD AND APPARATUS FOR TRANSMITTING UPLINK DATA USING MULTIPLE SERVING CELLS

(71) Applicant: LG ELECTRONICS INC., Seoul (KR)

(72) Inventors: Joonkui Ahn, Seoul (KR); Suckchel Yang, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 14/778,995

(22) PCT Filed: Mar. 31, 2014

(86) PCT No.: PCT/KR2014/002728
§ 371 (c)(1),
(2) Date: Sep. 21, 2015

(87) PCT Pub. No.: WO2014/163351
PCT Pub. Date: Oct. 9, 2014

(65) Prior Publication Data
US 2016/0057752 A1 Feb. 25, 2016

Related U.S. Application Data

(60) Provisional application No. 61/808,199, filed on Apr. 3, 2013, provisional application No. 61/809,422, filed on Apr. 8, 2013.

(51) Int. Cl.
*H04W 4/00* (2009.01)
*H04W 72/04* (2009.01)
(Continued)

(52) U.S. Cl.
CPC ......... *H04W 72/0446* (2013.01); *H04L 43/16* (2013.01); *H04W 56/004* (2013.01); *H04W 56/0005* (2013.01); *H04W 72/04* (2013.01)

(58) Field of Classification Search
None
See application file for complete search history.

(56) References Cited

U.S. PATENT DOCUMENTS

| 2012/0020320 A1 | 1/2012 | Issakov et al. |
| 2012/0115539 A1 | 5/2012 | Zhang et al. |

(Continued)

FOREIGN PATENT DOCUMENTS

| JP | WO 2012041422 A2 * | 4/2012 | ........ H04W 72/0446 |
| KR | 10-2009-0092429 | 9/2009 | |

(Continued)

OTHER PUBLICATIONS

Ericsson, et al., "Timing Alignment for CA," 3GPP TSG RAN WG1 Meeting #62, R1-104845, Aug. 2010, 3 pages.

(Continued)

*Primary Examiner* — Kouroush Mohebbi
(74) *Attorney, Agent, or Firm* — Lee Hong Degerman Kang Waimey

(57) ABSTRACT

Disclosed are a method and an apparatus for transmitting uplink data by means of multiple serving cells. A method for a terminal for transmitting uplink data by means of multiple serving cells may comprise the steps of: the terminal receiving a first timing advance command (TAC) for a first serving cell and a second TAC for a second serving cell; and determining whether the terminal transmits uplink data by means of the second serving cell on the basis of whether the timing difference is below the threshold value, wherein the timing difference is acquired on the basis of the first TAC and the second TAC, and the first serving cell can be a cell (Continued)

configured so that an uplink can be always transmitted regardless of the timing difference.

10 Claims, 16 Drawing Sheets

(51) Int. Cl.
  *H04W 56/00* (2009.01)
  *H04L 12/26* (2006.01)

(56) References Cited

U.S. PATENT DOCUMENTS

| | | |
|---|---|---|
| 2012/0257513 A1 | 10/2012 | Yamada |
| 2012/0257569 A1 | 10/2012 | Jang et al. |
| 2012/0281628 A1 | 11/2012 | Park et al. |
| 2012/0300752 A1 | 11/2012 | Kwon et al. |
| 2012/0307821 A1 | 12/2012 | Kwon et al. |
| 2015/0103811 A1 | 4/2015 | Mariner et al. |

FOREIGN PATENT DOCUMENTS

| | | |
|---|---|---|
| KR | 1020110081086 A | 7/2011 |
| KR | 1020110093632 A | 8/2011 |
| KR | 10-2012-0055552 | 5/2012 |
| KR | 1020120112779 A | 10/2012 |
| KR | 1020120113679 A | 10/2012 |
| WO | 2010151213 A1 | 12/2010 |
| WO | 2011/003187 | 1/2011 |
| WO | 2011098186 A1 | 8/2011 |
| WO | 2013025562 A2 | 2/2013 |

OTHER PUBLICATIONS

PCT International Application No. PCT/KR2014/002728, Written Opinion of the International Searching Authority dated Jun. 27, 2014, 1 page.

NTT DOCOMO, "Issues on UL Simultaneous Transmission for Multiple TA", 3GPP TSG RAN WG1 Meeting #67, R1-114070, Nov. 10, 2011, 3 pages.

European Patent Office Application No. 14778526.5, Search Report dated Oct. 25, 2016, 5 pages.

\* cited by examiner

FIG. 7

| | | |
|---|---|---|
| R | TAC | Oct 1 |
| TAC | UL Grant | Oct 2 |
| UL Grant | | Oct 3 |
| UL Grant | | Oct 4 |
| Temporary C-RNTI | | Oct 5 |
| Temporary C-RNTI | | Oct 6 |

METHOD AND APPARATUS FOR TRANSMITTING UPLINK DATA USING MULTIPLE SERVING CELLS

CROSS-REFERENCE TO RELATED APPLICATIONS

This application is the National Stage filing under 35 U.S.C. 371 of International Application No. PCT/KR2014/002728, filed on Mar. 31, 2014, which claims the benefit of U.S. Provisional Application No. 61/808,199, filed on Apr. 3, 2013 and 61/809,422, filed on Apr. 8, 2013, the contents of which are all hereby incorporated by reference herein in their entirety.

BACKGROUND OF THE INVENTION

Field of the Invention

The present invention relates to wireless communications, and more particularly, to a method and an apparatus for transmitting uplink data.

Related Art

Long-Term Evolution (LTE) based on 3rd Generation Partnership Project (3GPP) Technical Specification (TS) Release 8 is a leading next-generation mobile communication standard.

As set forth in 3GPP TS 36.211 V8.7.0(2009-05) "Evolved Universal Terrestrial Radio Access (E-UTRA); Physical Channels and Modulation (Release 8)," physical channels in LTE may be classified into downlink channels, such as physical downlink shared channel (PDSCH) and physical downlink control channel (PDCCH), and uplink channels, such as physical uplink shared channel (PUSCH) and physical uplink control channel (PUCCH). The PUCCH is an uplink control channel used for transmitting uplink control information, such as a hybrid automatic repeat request (HARQ) acknowledgement (ACK)/non-acknowledgement (NACK) signal, a channel quality indicator (CQI) and a scheduling request (SR).

Meanwhile, an evolution of 3GPP LTE, LTE-Advanced (LTE-A), is developing. 3GPP LTE-A adopts carrier aggregation. Carrier aggregation uses a plurality of component carriers. A component carrier is defined by center frequency and bandwidth. In carrier aggregation, a plurality of component carriers corresponds to a single cell. A user equipment (UE) provided with a service using a plurality of downlink component carriers may be interpreted as being provided with the service from a plurality of serving cells. Uplink synchronization of a UE in the case of using carrier aggregation may be difference uplink synchronization of a UE in the case of not using carrier aggregation.

To reduce interference between UEs due to uplink transmissions, it is important for a base station to maintain uplink time alignments of the UEs. A UE may be located at a random place within a cell and an arrival time an uplink signal transmitted from a UE takes to reach the base station may vary depending on the location of each UE. A UE located at a cell edge has a longer arrival time than a UE located in a cell center. On the contrary, the UE located in the cell center has a shorter arrival time than the UE located at the cell edge.

To reduce interference between UEs, it is necessary that a base station schedules uplink signals transmitted by UEs in a cell to be received within each time boundary. The base station needs to properly adjust transmission timings of the respective UEs according to situations of the respective UEs and such adjustment is referred to as uplink time alignment.

A random access process is one of processes for maintaining uplink time alignment. A UE acquires a time alignment value (also referred to as a timing advance (TA) value) through the random access process and maintains uplink time alignment by applying the time alignment value. As described above, when carrier aggregation is performed in 3GPP LTE-A, a procedure that a UE performs uplink time alignment and uplink transmission may be different from that in the case of performing no carrier aggregation.

SUMMARY OF THE INVENTION

An aspect of the present invention is to provide a method of transmitting uplink data using a plurality of servicing cells.

Another aspect of the present invention is to provide an apparatus for transmitting uplink data using a plurality of serving cells.

To achieve an aspect of the present invention, an uplink transmission method of a user equipment (UE) using a plurality of serving cells according to one embodiment of the present invention may include receiving, by the UE, a first timing advance command (TAC) for a first serving cell and a second TAC for a second serving cell and determining whether the UE transmits uplink data through the second serving cell based on whether a timing difference is a threshold or less, in which the timing difference may be acquired based on the first TAC and the second TAC, and the first serving cell may be configured to always perform uplink transmission regardless of the timing difference.

To achieve another aspect of the present invention, a UE for performing uplink transmission using a plurality of serving cells according to one embodiment of the present invention may include a radio frequency (RF) unit configured to transmit and receive a radio signal and a processor selectively connected to the RF unit, in which the processor may be configured to receive a first TAC for a first serving cell and a second TAC for a second serving cell and to determine whether the UE transmits uplink data through the second serving cell based on whether the timing difference is a threshold or less, the timing difference may be acquired based on the first TAC and the second TAC, and the first serving cell may be configured to always perform uplink transmission regardless of the timing difference.

A user equipment (UE) determines different uplink data transmission methods depending on a timing advance for each serving cell in performing uplink transmission using a plurality of serving cells, thereby enhancing uplink data transmission efficiency of the UE.

BRIEF DESCRIPTION OF THE DRAWINGS

FIG. 7 illustrates an example of a random access response.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, a terminal, a wireless terminal, etc. Also, the wireless device may be a device that supports data communication only such as a machine-type communication device.

A base station (BS) is generally a fixed station that communicates with the wireless device and may be referred to as another terminology, such as an evolved Node-B (eNB), a base transceiver system (BTS), an access point, etc.

Figure 1:
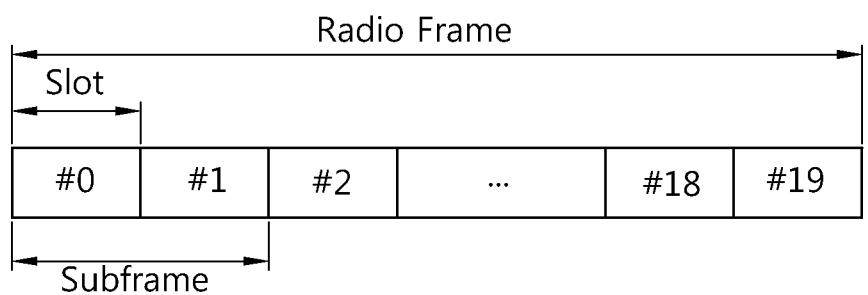
FIG. 1 illustrates a structure of a radio frame in a Long Term Evolution (LTE) system.

FIG. 1 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (March 2008).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
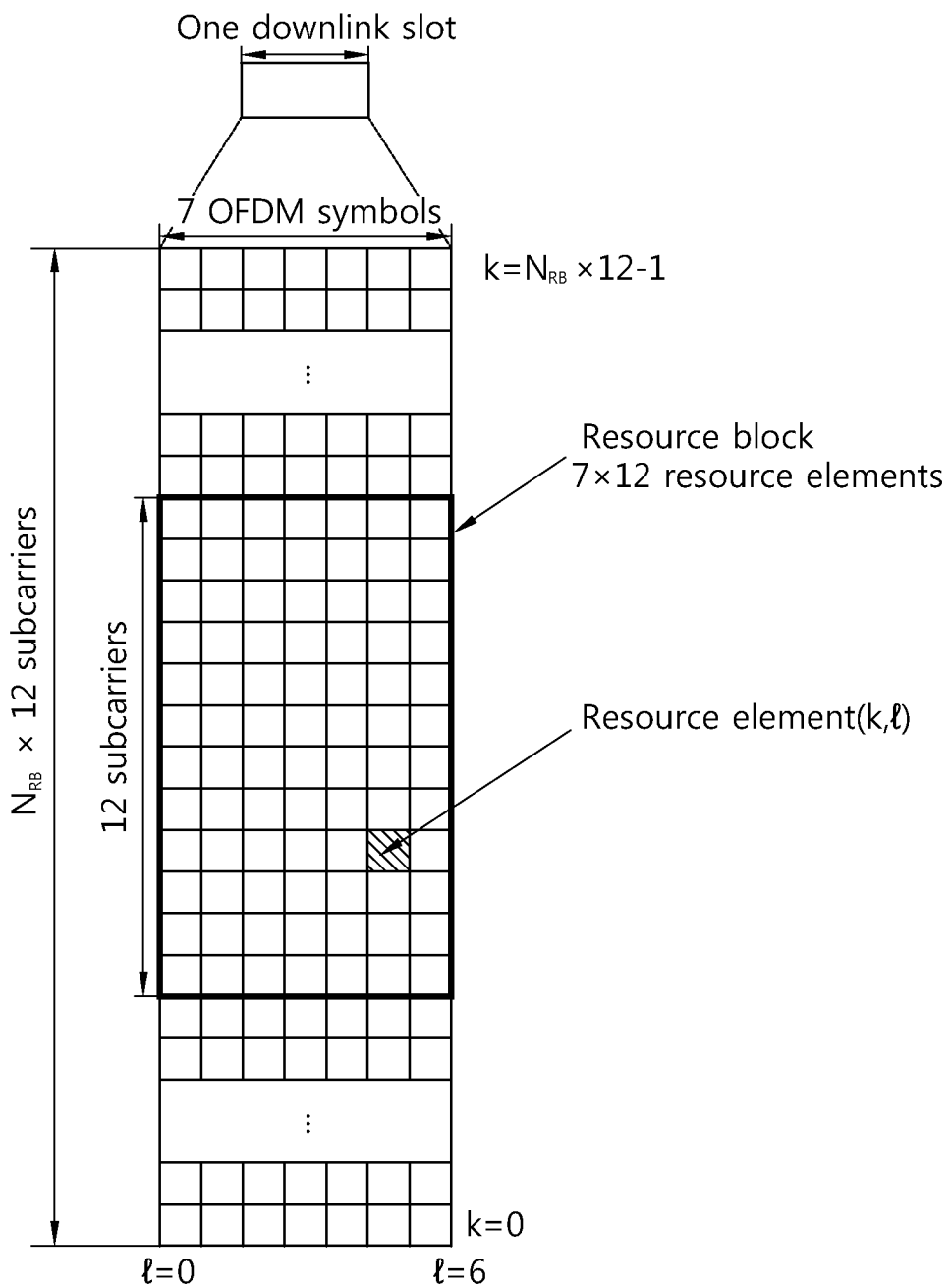
FIG. 2 illustrates an example of a resource grid for a downlink slot.

FIG. 2 shows an example of a resource grid of a downlink slot.

A downlink slot includes a plurality of OFDM symbols in the time domain and NRB number of resource blocks in the frequency domain. The NRB number of resource blocks included in the downlink slot may be determined depending upon a downlink transmission bandwidth which is configured in a cell. For example, in an LTE system, NRB may have any one value of 60 to 110 depending upon the transmission bandwidth which is used. One resource block 200 includes a plurality of subcarriers in the frequency domain. An uplink slot may have the same structure as that of the downlink slot.

Each element on the resource grid is called a resource element 220. The resource elements 220 on the resource grid can be discriminated by a pair of indexes (k,l) in the slot. Here, k (k=0, . . . , NRB×12-1) is a subcarrier index in the frequency domain, and l (l=0, . . . , 6) is an OFDM symbol index in the time domain.

Herein, one resource block 200 may include 7×12 resource elements made up of seven OFDM symbols in the time domain and twelve subcarriers in the frequency domain. Such a size is just an example, and the number of OFDM symbols and subcarriers constituting one resource block 200 may be changed. The resource block pair indicates a resource basis that includes two resource blocks.

As described above, the number of OFDM symbols in one slot may have different values depending on the CP. Also, the number of resource blocks included in one slot may be changed depending on the size of overall frequency bandwidth.

Figure 3:
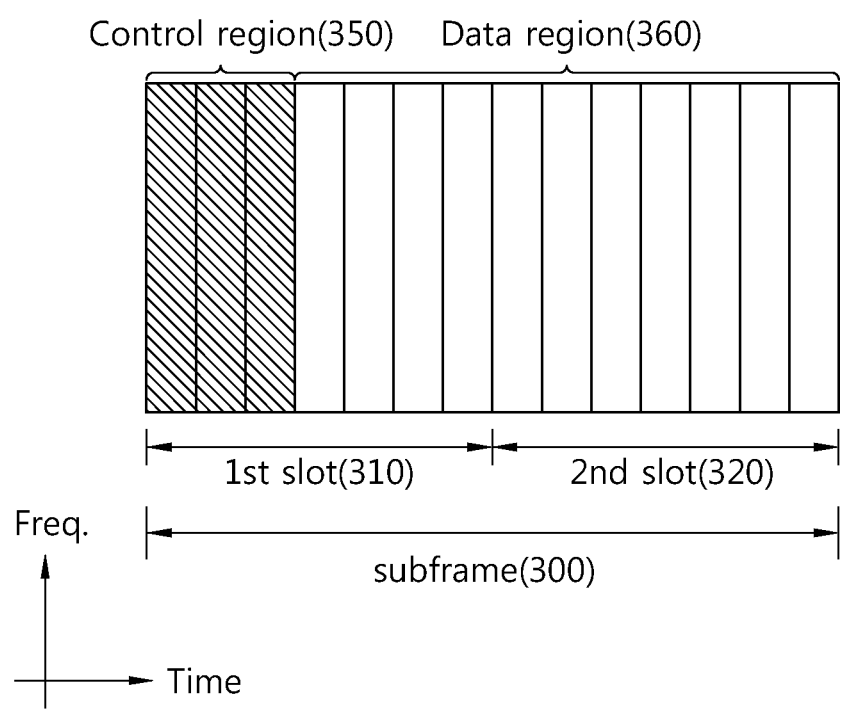
FIG. 3 illustrates a structure of a downlink subframe.

FIG. 3 shows the structure of a downlink subframe.

A downlink subframe 300 may be distinguished into two slots 310 and 320 base on the time domain. Each of the slots 310 and 320 includes seven OFDM symbols in the normal CP. A resource region that corresponds to first three OFDM symbols (maximum four OFDM symbols with respect to a 1.4 MHz bandwidth) of a first slot 310 in the subframe 300 may be used as a control region 350 to which control channels are allocated. The other remaining OFDM symbols may be used as a data region 360 to which a traffic channel such as a physical downlink shared channel (PDSCH) is allocated.

The PDCCH may be a control channel that transmits, for example, a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual wireless devices in a certain UE group, an activation of a voice over internet protocol (VoIP), and the like. A plurality of bases that transmits the PDCCH data may be defined in the control region 350. A wireless device may obtain control data by monitoring the plurality of bases that transmits the PDCCH data. For example, the PDCCH data may be transmitted to a wireless device based on one or an aggregation of a plurality of consecutive control channel elements (CCE). The CCE may be a basis of transmitting the PDCCH data. The CCE may include a plurality of resource element groups. The resource element group is a resource basis that includes four usable resource elements.

The BS determines a PDCCH format according to a DCI to be transmitted to the wireless device, and attaches a cyclic redundancy check (CRC) to the DCI. A unique radio network temporary identifier (RNTI) is masked on the CRC according to the owner or the purpose of the PDCCH. In case of a PDCCH for a particular wireless device, a unique identifier, e.g., a cell-RNTI (C-RNTI), of the wireless device, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the wireless device, a random access-RNTI (RA-RNTI) may be masked on the CRC.

Figure 4:
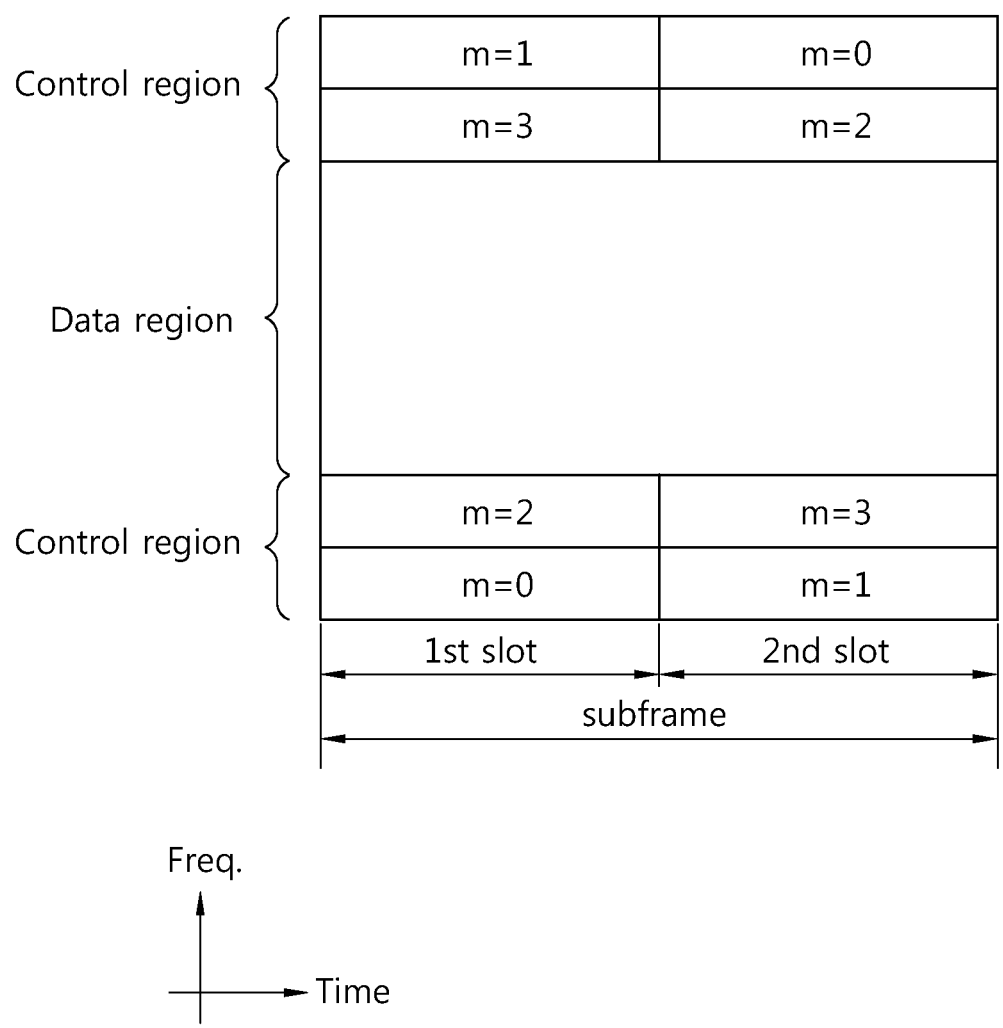
FIG. 4 illustrates a structure of an uplink subframe in 3rd Generation Partnership Project (3GPP) LTE.

FIG. 4 is a view illustrating the structure of an uplink subframe in 3GPP LTE.

The uplink subframe may be divided into a control region allocated to a physical uplink control channel (PUCCH) for delivering uplink control information and a data region allocated to a physical uplink shared channel (PUSCH) for delivering user data. PUCCH resources for allocation may be located at the edge of bandwidth of a component carrier (CC).

The PUCCH may be allocated based on a RB pair in the subframe. RBs corresponding to the RB pair may be allocated to different subcarriers in a first and a second slots respectively. m is a position index indicating the position of a logical frequency domain of the RB pair which is allocated to the PUCCH in the subframe. RBs having the same value of m are allocated to different subcarriers of the first and second slots.

According to 3GPP TS 36.211 V8.7.0, the PUCCH may have various formats. It is possible to use Different PUCCH formats with different bit numbers in the subframe according to a modulation scheme for use in the PUCCH format.

Table 2 shows an example of bit numbers per subframe and the modulation scheme according to the PUCCH format.

TABLE 2

| PUCCH format | Modulation scheme | bit number per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

PUCCH format 1 for scheduling request (SR) transmission, PUCCH format 1a/1b for transmitting an ACK/NACK signal for HARQ, PUCCH format 2 for CQI transmission, and PUCCH format 2a/2b for simultaneous transmission of the CQI and the ACK/NACK signals are used. When only the ACK/NACK signal is transmitted in the subframe, PUCCH format 1a/1b is used, and when only the SR is transmitted, PUCCH format 1 is used. When the SR and the ACK/NACK signal are transmitted simultaneously, PUCCH format 1 is used, and the ACK/NACK signal is transmitted after being modulated to resources allocated to the SR.

The entire PUCCH formats use cyclic shift (CS) of a sequence for each OFDM symbol. A base sequence is cyclically shifted by specific CS amount to generate a cyclic shift sequence. The specific CS amount is indicated by a CS index.

The sequence length is equal to the number of an element included in the sequence. The sequence index for indicating the sequence may be determined based on a cell identifier, a slot number within a radio frame, and the like. Assuming that a base sequence is mapped to one resource block in the frequency domain, one resource block includes 12 subcarriers, and thus the length of the base sequence N is 12. The cyclic shift sequence may be generated by cyclically shifting the base sequence.

The available cyclic shift index to the base sequence may be induced from the base sequence based on a CS interval. For example, when the base sequence length is 12 and the CS interval is 2, total number of the available cyclic shift indices to the base sequence is 6. Hereinafter, HARQ ACK/NACK signal transmission in PUCCH format 1b will be described.

Figure 5:
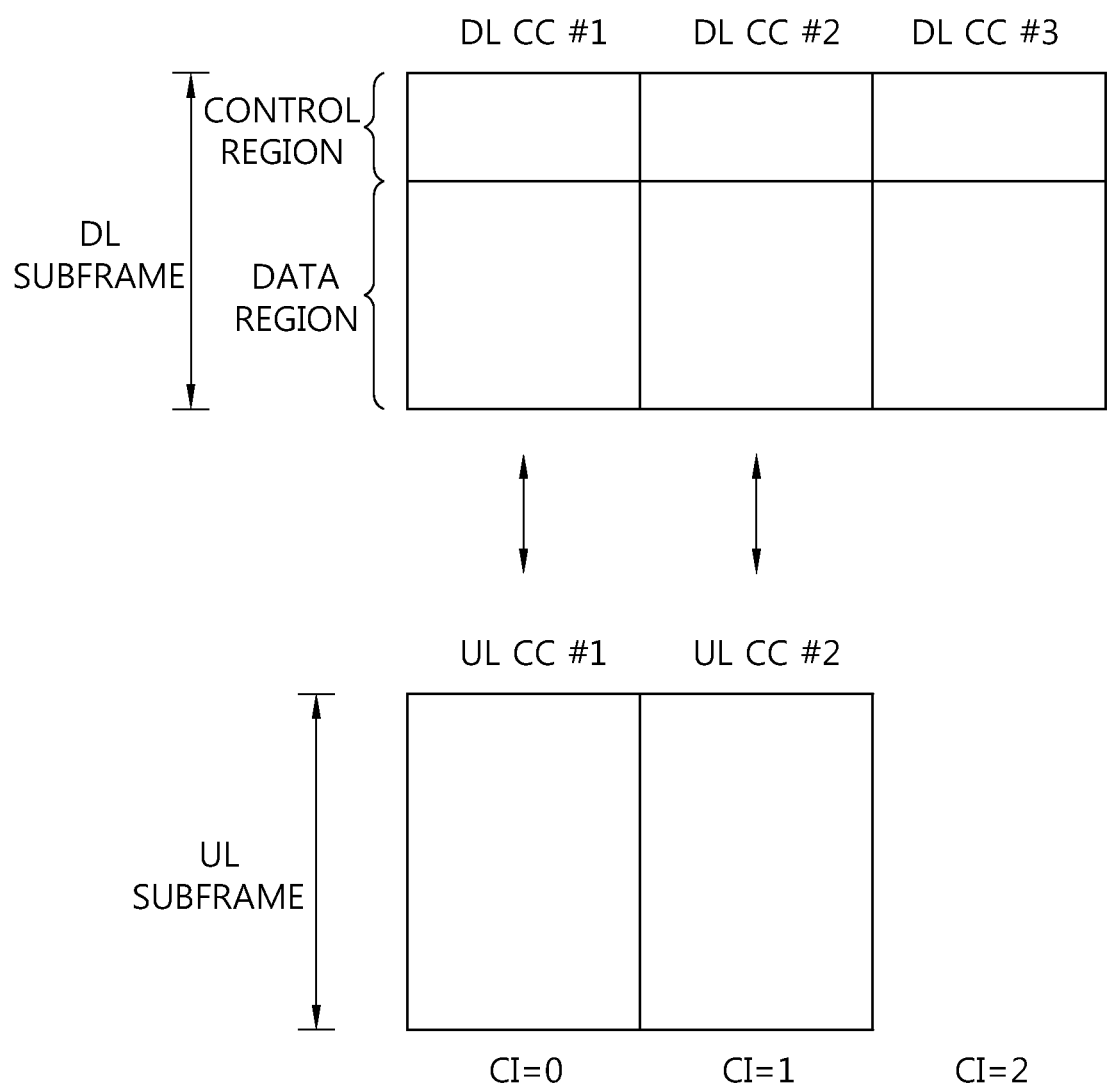
FIG. 5 is a schematic view illustrating multiple carriers in an LTE-Advanced (LTE-A) system.

FIG. 5 is a schematic view illustrating a multiple carrier in an LTE-A system.

A 3GPP LTE system supports a case where a DL bandwidth and a UL bandwidth are configured differently, in which one component carrier (CC) is required for each of a DL and a UL. The 3GPP LTE system supports up to 20 MHz, in which the DL bandwidth and the UL bandwidth may be different but one CC is supported for each of the UL and DL.

However, an LTE-A system may support a plurality of CCs through spectrum aggregation (also referred to as bandwidth aggregation or carrier aggregation). For example, when five CCs are allocated as a granularity of a carrier unit with a bandwidth of 20 MHz, the LTE-A system may support a bandwidth of up to 100 MHz.

One DL CC or a pair of a UL CC and a DL CC may correspond to one cell. Thus, it is understood that a UE communicating with a base station through a plurality of DL CCs is provided with services from a plurality of serving cells.

FIG. 5 illustrates three DL CCs and two UL CCs which are subjected to carrier aggregation. The number of DL CCs and UL CCs subjected to carrier aggregation is not limited. A PDCCH and PDSCH are independently transmitted in each DL CC, and a PDCCH and PDSCH are independently transmitted in each UL CC. Two DL CC-UL CC pairs and one DL carrier are defined, which means that a UE is provided with services from three serving cells.

The UE may monitor a PDCCH in a plurality of DL CCs and simultaneously receive DL transport blocks through the plurality of DL CCs. Further, the UE may simultaneously transmit a plurality of UL transport blocks through a plurality of UL CCs.

A pair of a first DL CC (DL CC #1) and a first UL CC (UL CC #1) may be a first serving cell, a pair of a second DL CC (DL CC #2) and a second UL CC (UL CC #2) may be a second serving cell, and a third DL CC (DL CC #3) may be a third serving cell. Each serving cell may be identified by a cell index (CI). A CI may be unique for a cell or have a UE-specific value. Here, for example, the first to third serving cells are allocated CIs of 0, 1, 2, respectively.

Serving cells may be classified into a primary cell or P-cell and a secondary cell or S-cell. A P-cell may also be referred to as a primary component carrier (PCC), and an S-cell may also be referred to as a second component carrier (SCC). A P-cell may be designated in an initial connection establishment procedure, connection reestablishment procedure and handover procedure of a UE. A P-cell may alternatively be referred to as a reference cell. An S-cell may be configured after a radio resource control (RRC) connection is established and be used for providing additional radio resources. At least one P-cell is always configured and an S-cell may be added/revised/cancelled by higher-level signaling (for example, an RRC message).

A P-cell may have a fixed CI. For example, a lowest CI may be designated as a CI of the P-cell. Specifically, the CI of the P-cell may be allocated 0, and CIs of S-cells may be allocated sequential values from 1.

The UE may monitor a PDCCH through a plurality of serving cells. However, even in the presence of N serving cells, a base station may configure the UE to monitor PDCCHs of M (M≤N) serving cells. Further, the base station may configure the UE to preferentially monitor PDCCHs of L (L≤M≤N) serving cells.

In performing carrier aggregation in LTE-A, non-cross carrier scheduling and cross-carrier scheduling may be used. In non-cross carrier scheduling, when DL transmission is performed through a particular DL CC, UL transmission may be performed only through a UL CC corresponding to the particular DL CC.

In detail, a DL allocation and a UL grant, transmitted through a PDCCH of a DL CC of a particular cell, may be used for scheduling a PDSCH/PUSCH of the cell to which the DL CC belongs (the cell is constituted by the DL CC or a UL CC corresponding to the DL CC). A relationship between the DL CC and the UL CC may be configured through system information block (SIB)-2. That is, a search space that is a region for detecting the DL allocation and UL grant may be included in the PDCCH of the cell in which the PDSCH/PUSCH to be scheduled is located.

In cross-carrier scheduling, a monitored cell may be configured. A DL allocation and a UL grant, transmitted in a PDCCH region of the monitored cell, may be a DL allocation and a UL grant for a cell configured to be scheduled in the monitored cell. That is, in cross-carrier scheduling, the PDCCH of the monitored cell may transmit resource scheduling information on a plurality of CCs.

In existing 3GPP LTE, although a UE supports a plurality of serving cells, a single timing advance (TA) value is commonly applied to the serving cells. However, when the serving cells are substantially far from each other in a frequency domain, propagation properties may change by serving cells. Also, a remote radio header (RRH) and devices may be present in a base station area to extend coverage or remove coverage holes. In this case, since a distance between the base station and the UE and a distance between the RRH and the UE are different from each other, propagation properties may change.

Hereinafter, uplink time alignment in 3GPP LET is described.

To reduce interference due to uplink transmissions from a plurality of UEs, it is important for a base station to maintain uplink time alignments of the UEs. A UE may be located at a random place within a cell and an arrival time an uplink signal transmitted from a UE takes to reach the base station may vary depending on the location of each UE. A UE located at a cell edge has a longer arrival time than a UE located in a cell center. On the contrary, the UE located in the cell center has a shorter arrival time than the UE located at the cell edge.

To reduce interference by uplink transmissions from a plurality of UEs, it is necessary that a base station schedules uplink signals transmitted by a plurality of UE in a cell to be received within each time boundary. The base station properly adjusts transmission timings of the respective UEs to reduce interference in uplink transmission from the plurality of UEs. Adjusting a transmission timing of a UE by the base station may be referred to as uplink time alignment.

As one method of uplink time alignment, a UE may perform random access. The UE transmits a random access preamble to the base station. The base station determines a time alignment value for advancing or delaying a transmission timing of the UE based on the received random access preamble. The base station transmits a random access response including the determined time alignment value to the UE. The UE may update the uplink transmission timing based on the time alignment value included in the random access response.

According to another method, the base station may periodically or randomly receive a sounding reference signal from the UE, determine a time alignment value of the UE through the sounding reference signal, and notify the UE of the determined time alignment value through a medium access control (MAC) control element (CE).

A time alignment value may be information transmitted from the base station to maintain uplink time alignment of a UE and a timing advance command (TAC) transmitted from the base station may include a time alignment value.

A UE generally has mobility, and thus a transmission timing of the UE may change depending on speed and location of the travelling UE. Thus, a time alignment value received by the UE may be a value valid for a specific period. A period for which a time alignment value is valid may be determined based on a time alignment timer.

The UE receives the time alignment value from the base station, updates time alignment, and then starts or restarts a time alignment timer. The UE is allowed to perform uplink transmission only when the time alignment timer is in operation. A value of the time alignment timer may be transmitted by the base station to the UE through system information or an RRC message, such as a radio bearer reconfiguration message.

When the time alignment timer expires or is not operating, the UE assumes that the UE does not match the base station in time alignment and does not transmit any uplink single except for a random access preamble.

Figure 6:
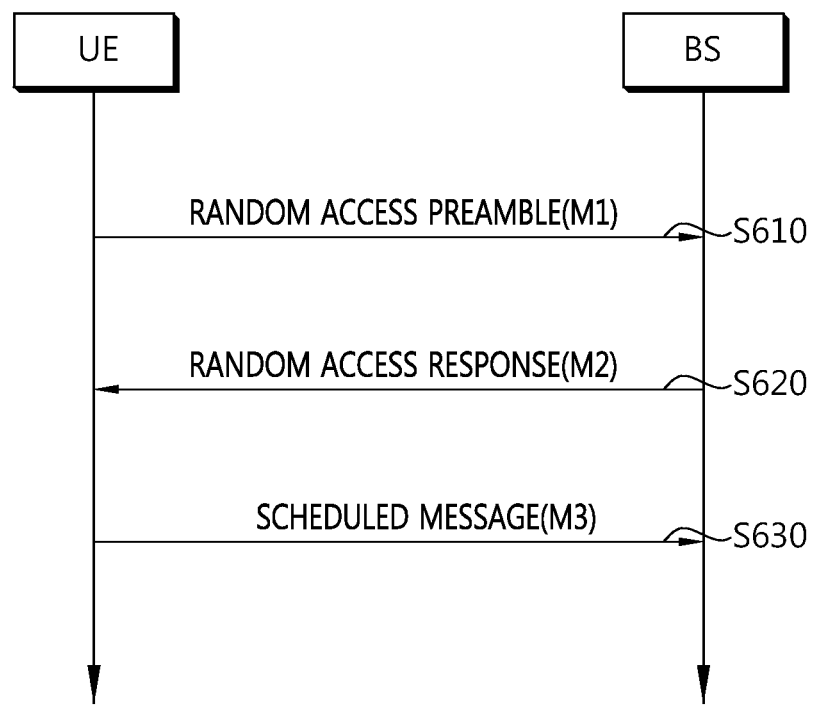
FIG. 6 is a flowchart illustrating a random access process in 3GPP LTE.

FIG. 6 is a flowchart illustrating a random access process in 3GPP LTE.

As described above, the random access process may be used for a UE to acquire uplink synchronization with a base station or to be allocated an uplink radio resource from the base station.

The UE receives a root index and a physical random access channel (PRACH) configuration index from the base station. There are 64 random access preamble candidates defined by a Zadoff-Chu (ZC) sequence in each cell and the root index is a logical index for the UE to generate the 64 random access preamble candidates.

Transmission of a random access preamble is limited to a particular time resource and frequency resource in each cell. The PRACH configuration index indicates a particular subframe and preamble format for transmitting a random access preamble.

The UE transmits a random access preamble randomly selected (step S610).

The UE selects one of the 64 random access preamble candidates. The UE selects a subframe indicated by the PRACH configuration index. The UE transmits the selected random access preamble in the selected subframe.

The base station, which receives the random access preamble, transmits a random access response (RAR) to the UE (step S620).

The RAR is detected in two steps. First, the UE detects a PDCCH masked with a random access-RNTI (RA-RNTI). The UE receives the RAR in an MAC protocol data unit (PDU) on a PDSCH indicated by the detected PDCCH.

FIG. 7 illustrates an example of the RAR.

The RAR may include a TAC, a UL grant and a temporary cell-radio network temporary identifier (C-RNTI).

The TAC may include a time alignment value transmitted by the base station for UL time alignment of the UE. The UE updates a UL transmission timing using the time alignment value. When the UE perform time alignment based on the received TAC, a time alignment timer is started or restarted. That is, the TAC may include information for timing adjustment of the UE.

A UL grant transmit may include UL resource allocation information and a transmit power command (TPC). The TPC is used to determine transmit power for a scheduled PUSCH.

Referring back to FIG. 6, the UE transmits a scheduled message to the base station according to the UL grant in the RAR (S630).

Figure 8:
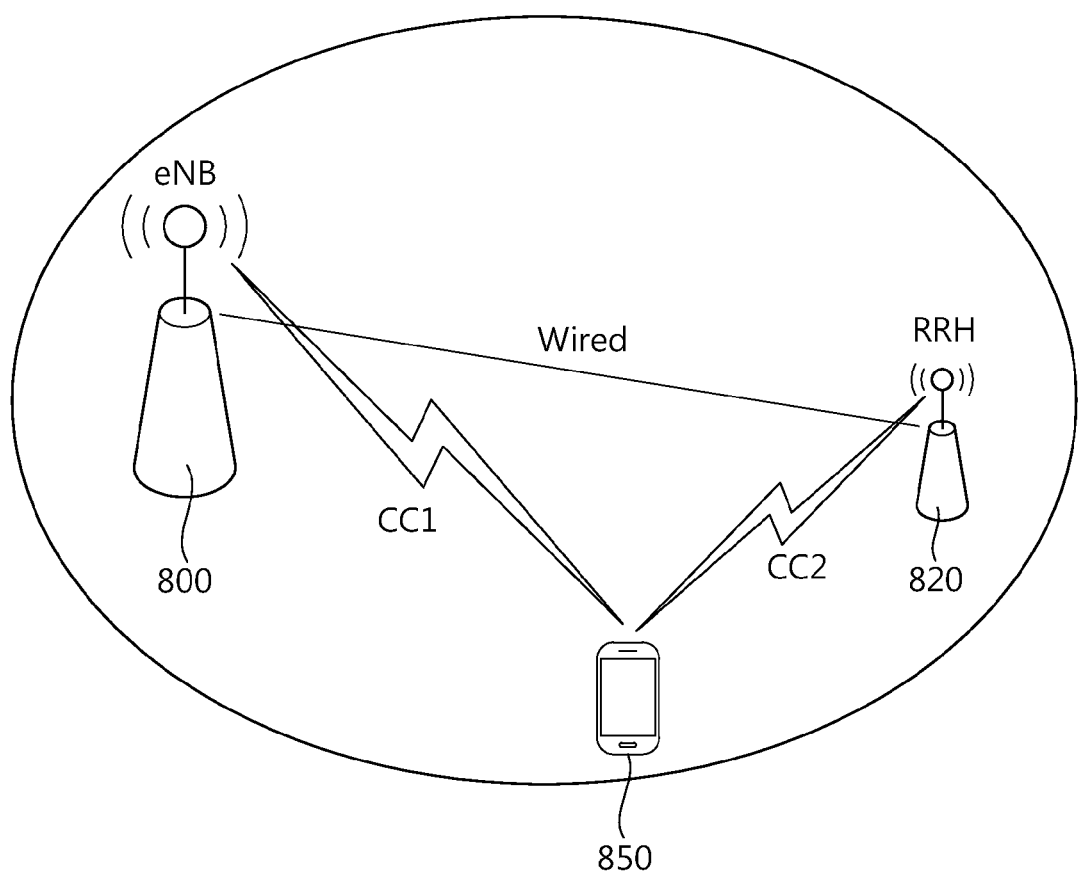
FIG. 8 is a schematic view illustrating differences in propagation properties between a plurality of cells.

FIG. 8 is a schematic view illustrating differences in propagation properties between a plurality of cells.

In existing LTE Release 8/9/10 systems, when a plurality of serving cells is aggregated, a UE performs UL transmission by applying a TA value applicable to one cell (for example, P-cell or PCC) commonly to the plurality of serving cells.

When data transmission and reception between a UE and a base station is performed based on carrier aggregation, a plurality of serving cells which is substantially far from each other in a frequency domain and has different propagation properties may be aggregated. Further, since a particular cell among the plurality of serving cells may be used in a remote radio header (RRH), such as a repeater, in order to extend coverage or remove coverage holes, propagation properties may be different between the serving cells.

When the serving cells have different propagation properties, applying a single TA value commonly to the plurality of serving cells in UL transmission by a UE as used in a conventional method may cause a desynchronization of a UL transmission timing for a particular serving cell, thereby leading to time misalignment between the UE and the base station.

For example, FIG. 8 supposes that a macro base station 800 performs DL transmission to a UE through a first serving cell and an RRH 820 performs DL transmission to the UE through a second serving cell. In detail, the macro base station 800 may transmit DL data to the UE through the first serving cell and the RRH 820 installed due to limited coverage may transmit DL data to the UE through the second serving cell.

A propagation delay of the DL data transmitted through the first serving cell may have a different value from a propagation delay of the DL data transmitted through the second serving cell due to various reasons (for example, a difference in processing time between the RRH 820 and the macro base station 800 and a difference between a distance from the RRH 820 to the UE and a distance from the macro base station 800 to the UE).

When a plurality of serving cells which is carrier-aggregated have different propagation delays, a UE may perform UL transmission based on different TA values for the respective serving cells in performing UL transmissions through the serving cells with the different propagation delays. That is, when pieces of DL data transmitted through the plurality of serving cells have different propagation delay properties, the UE may perform UL transmissions based on a plurality of TA values.

Figure 9:
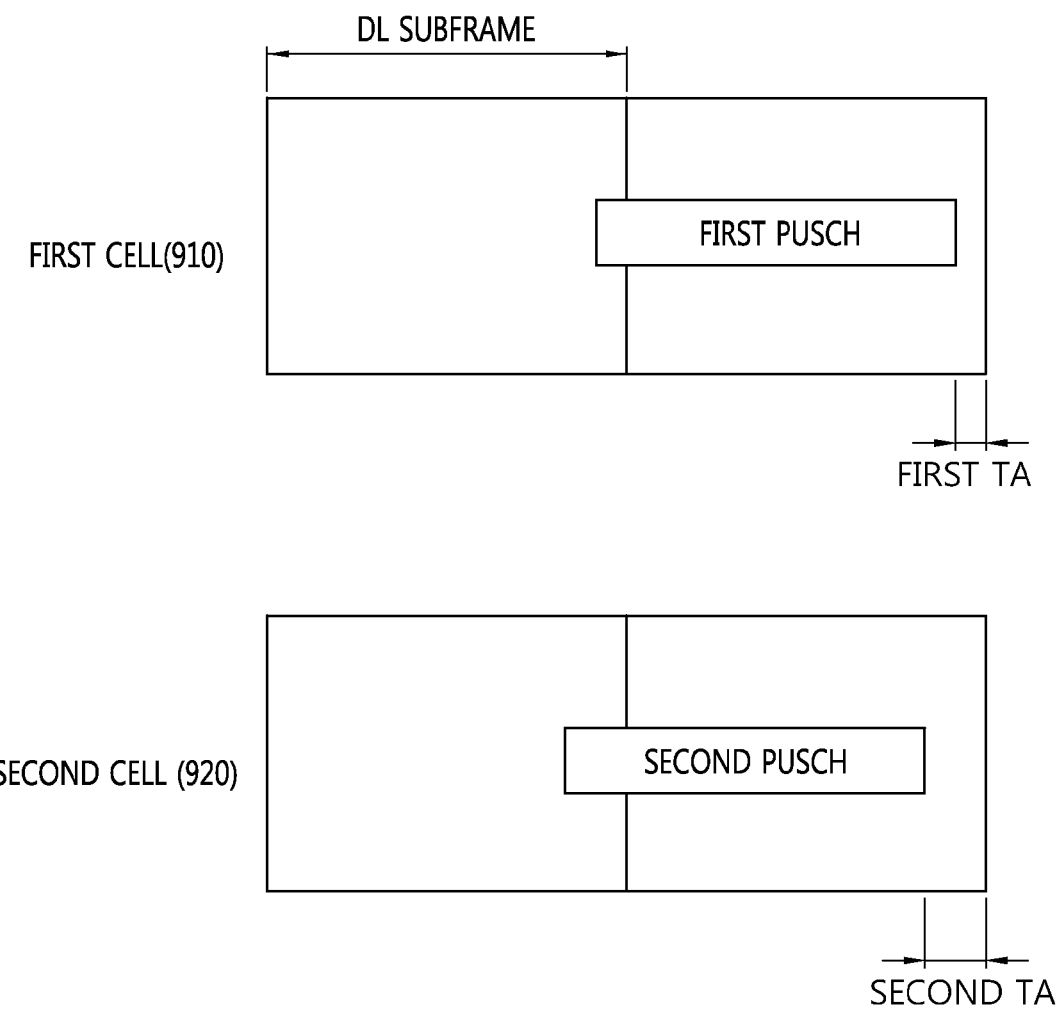
FIG. 9 is a schematic view illustrating uplink transmission of a user equipment (UE) based on a plurality of timing advance (TA) values.

FIG. 9 is a schematic view illustrating UL transmission of a UE based on a plurality of TA values.

FIG. 9 illustrates UL transmissions through two serving cells. A propagation delay for a second serving cell (for example, S-cell) 920 may be greater than a propagation delay for a first serving cell (for example, P-cell) 930.

In this case, a second TA value applied to transmission of second UL data (for example, second PUSCH data) by a UE through the second serving cell 920 may be greater than a first TA value applied to transmission of first UL data (for example, first PUSCH data) through the first serving cell 910. When data transmission and reception is performed based on carrier aggregation, a TA value for each carrier may be applied. TA values for a plurality of serving cells may have different from each other. TA information on each of the serving cells may be transmitted to a UE from a base station corresponding to each serving cell.

When a difference between a first transmission time of first UL data transmitted by the UE through the first serving cell 910 and a second transmission time of second UL data transmitted by the UE through the second serving cell is a certain value or greater due to a difference between the first TA value and the second TA value, various problems may occur. When the difference between the first TA value and the second TA value is a certain value or greater, for example, transmission timing relationship between the base station and the UE is not regular to cause malfunctions of the base station and the UE. Further, when the UE processes received DL data and transmits UL data to the base station in response to the DL data, complexity increases and a processing time for UL transmission by the UE may be insufficient.

Hereinafter, one embodiment of the present invention discloses an UL transmission method of a UE when the UE receives TA values corresponding to the respective serving cells (for example, the first serving cell 910 and the second serving cell 920) and a difference between the first TA value for the first serving cell 910 and the second TA value for the second serving cell 920 is a threshold or greater. The threshold may be set in the UE through a higher signal or be recognized in advance by the UE. In the embodiment of the present invention, when the difference between the TA values of the respective serving cells is the threshold or greater when the UE performs UL transmission, the UE may drop UL data transmission of the UE or limit a UL transmission timing of the UE. The following embodiment of the present invention discloses a detailed operation of the UE when the difference between the TA values is the threshold or greater.

In the following embodiment, the difference between the TA values for the plurality of serving cells may be interpreted variously. A TA value may be a value representing how much UL transmission precedes a DL reception time of the UE in a time domain. Reception times at which the UE receives DL data from the respective serving cells or boundaries of DL subframes may not be the same. Thus, a reference time for calculating a TA value for each serving cell may vary depending on serving cells. When the difference between the TA values for the respective serving cells is simply calculated without considering a DL data reception time, the difference between the TA values may be a value reflecting even a difference between the reception times of DL data that the UE receives through respective carrier components.

The difference between the TA values for the plurality of serving cells illustrated in the embodiment of the present invention may be a TA value difference which reflects even the difference between the reception times of DL data or a value obtained in consideration of only a difference between transmission timings of UL data transmitted through the respective serving cells when the UE transmits a UL subframe through the respective serving cells. Here, a TA value for a particular cell may mean merely a transmission timing of the UE in the cell. A TA difference in the embodiment of the present invention may also be interpreted as the difference between the TA values for the respective serving cells received by the UE from the base station, a difference in transmission timings to be applied by the UE in transmission, or a difference between TA values derived based on a TAC received by the UE. Signal transmission in which TA application managed through a TAC value is excluded, such as a PRACH, may not be subjected to a TA difference limitation method to be mentioned. In the following embodiments of the present invention, for convenience of description, a TA value difference will be described on the assumption that DL data reception times as a reference for deriving the TA value difference are the same in a plurality of serving cells.

Figure 10:
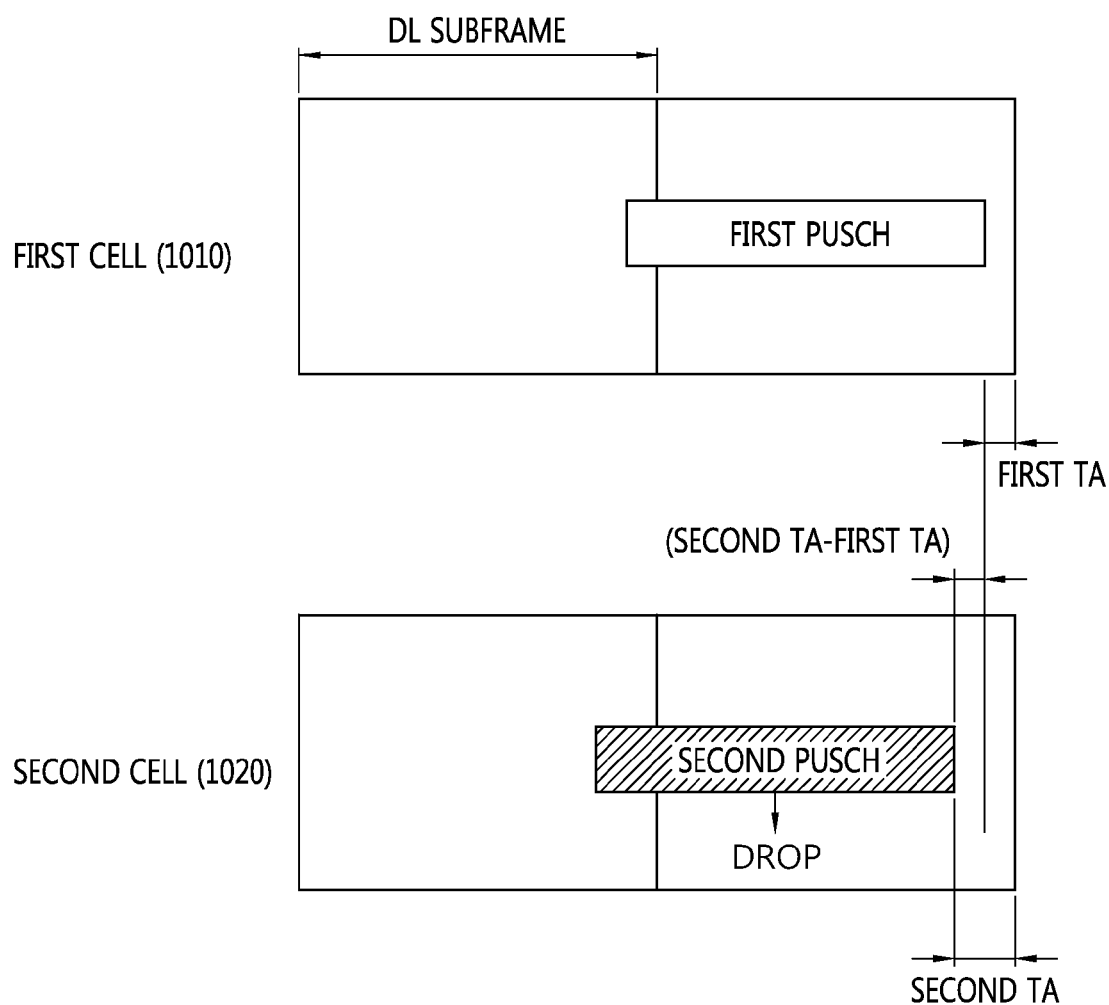
FIG. 10 is a schematic view illustrating an uplink transmission method according to an embodiment of the present invention.

FIG. 10 is a schematic view illustrating an uplink transmission method according to an embodiment of the present invention.

FIG. 10 illustrates a method of dropping a UL signal when a difference between TA values for a plurality of serving cells is a threshold or greater.

Whether the difference between the TA values for the plurality of serving cells is the threshold or greater may be determined based on a TA value for a particular serving cell (reference TA value). According to the embodiment of the present invention, it may be determined whether a difference between the reference TA value and a TA value for another serving cell carrier-aggregated with the particular serving cell is the threshold or greater. When the difference between the reference TA value and the TA value for the other serving cell is the threshold or greater, UL transmission performed through the other serving cell may be dropped. The serving cell for determining the reference TA value may be a predetermined serving cell (for example, a PCC). Alternatively, the serving cell for determining the reference TA value may be set through a high-layer signal, such as RRC signaling.

Referring to FIG. 10, a first TA value for a first serving cell 1010 may be set as the reference TA value and a difference between the reference TA value and a second TA value for a second serving cell 1020 may be the threshold or greater. In this case, UL data (for example, second PUSCH data) transmitted through the second serving cell may be dropped.

Dropping UL transmission in a serving cell may mean an operation of the UE not transmitting UL data (for example, a periodic channel quality indicator (CQI)) configured to be transmitted in advance in a serving cell or an operation of the UE not expecting or neglecting a UL scheduling command for a serving cell.

Figure 11:
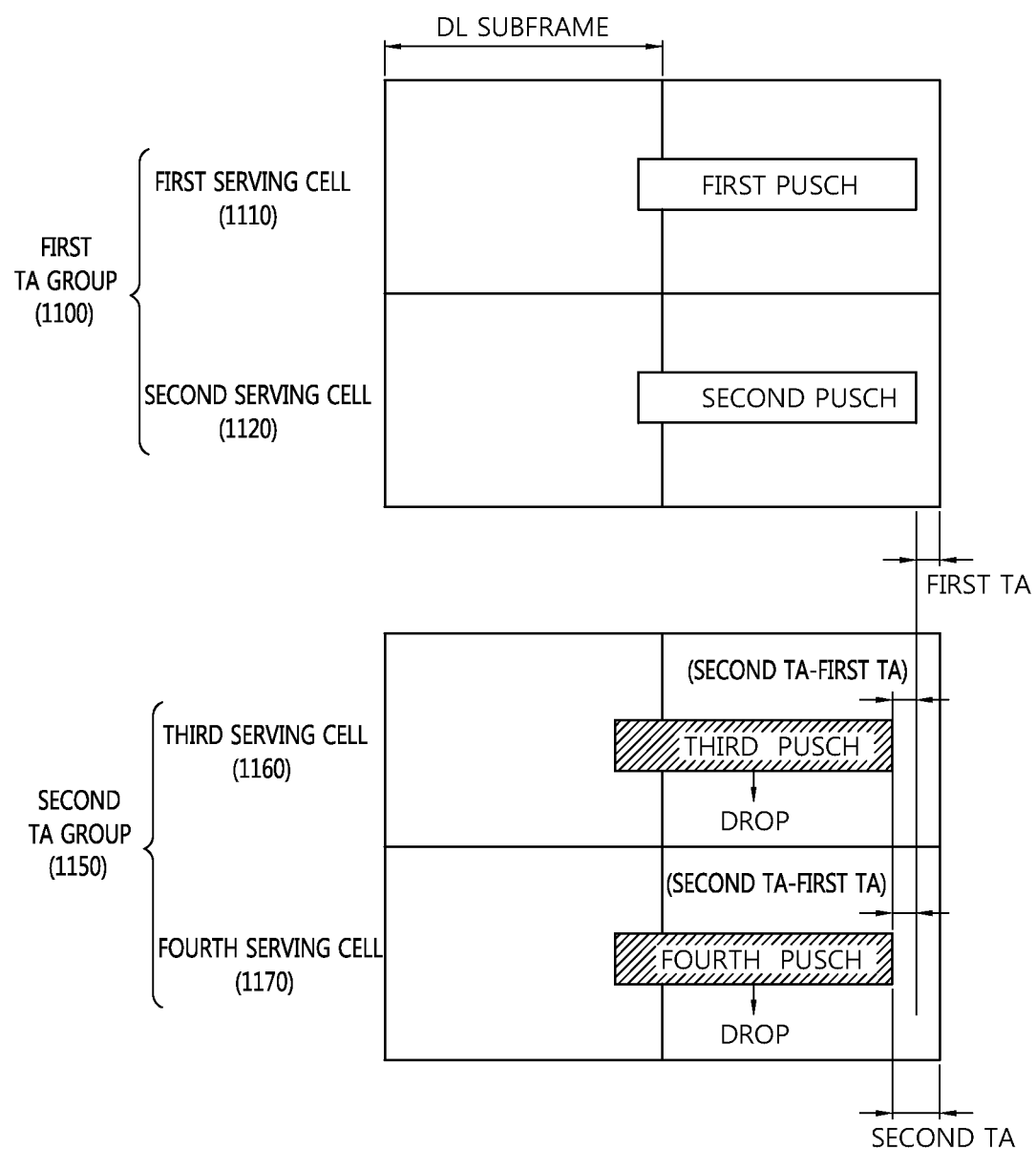
FIG. 11 is a schematic view illustrating an uplink transmission method according to an embodiment of the present invention

FIG. 11 is a schematic view illustrating an uplink transmission method according to an embodiment of the present invention.

FIG. 11 illustrates a method of dropping a UL signal of a particular TA group when a plurality of serving cells is classified into different TA groups and a difference between TA values for the TA groups is a threshold or greater.

Referring to FIG. 11, a first serving cell 1110 and a second serving cell 1120 may be classified into a first TA group 1100, and a third serving cell 1130 and a fourth serving cell 1140 may be classified into a second TA group 1150. The same TA group may be a group with a TA determined based on the same TAC. A TA for the first TA group 1100 may be set as a first TA value and a TA for the second TA group 1150 may be set as a second TA value.

Whether the difference between TA values for the plurality of TA groups is the threshold or greater may be determined based on a TA value for a particular TA group (reference TA value). According to the embodiment of the present invention, it may be determined whether a difference between the reference TA value and a TA value for another TA group carrier-aggregated with the particular TA group is the threshold or greater. When the difference between the reference TA value and the TA value for the other TA group is the threshold or greater, UL transmission performed through the other TA group may be dropped. The TA group for determining the reference TA value may be a TA group including a predetermined serving cell (for example, a PCC). Alternatively, the TA group for determining the reference TA value may be set through a high-layer signal, such as RRC signaling.

Referring to FIG. 11, the first TA value for the first TA group 1100 may be set as the reference TA value and it may be determined whether a difference between the reference TA value and the second TA value for the second TA group 1150 is a threshold or greater. When the difference between the first TA value as the reference TA value and the second TA value is the threshold or greater, UL data (for example, third PUSCH data and fourth PUSCH data) transmitted through the serving cells included in the second TA group 1150, the third serving cell 1160 and the fourth serving cell 1170, may be dropped.

Figure 12:
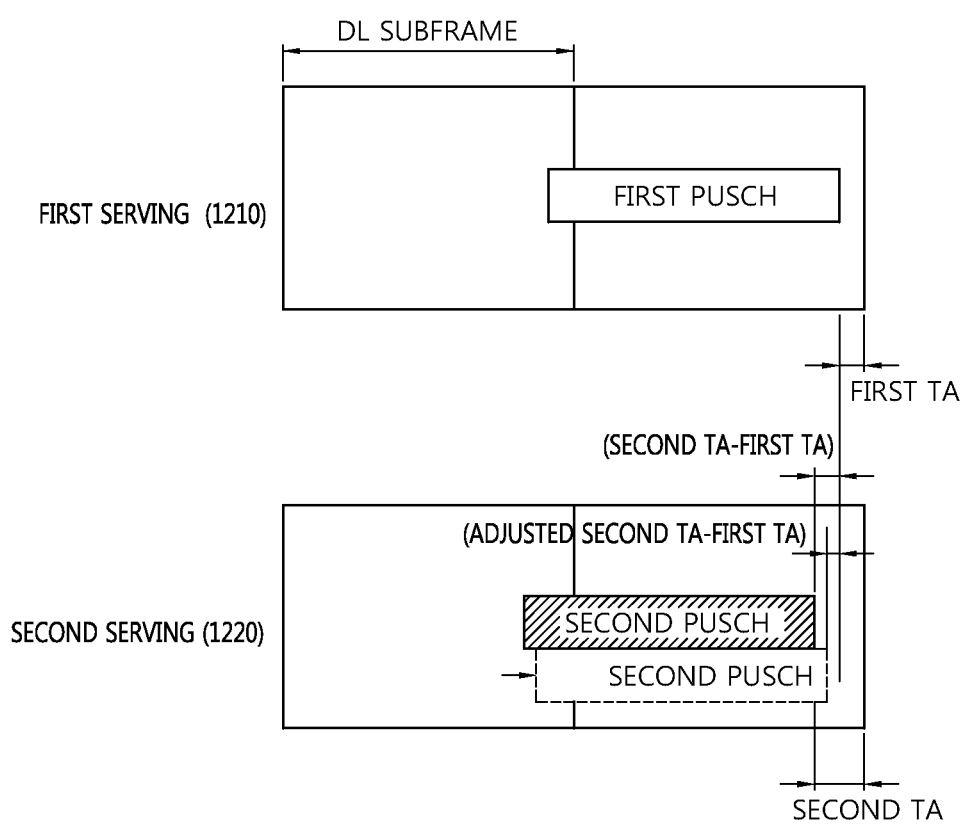
FIG. 12 is a schematic view illustrating an uplink transmission method according to an embodiment of the present invention.

FIG. 12 is a schematic view illustrating an uplink transmission method according to an embodiment of the present invention.

In FIG. 12, when a difference between TA values for a plurality of carrier components is a threshold or greater, UL transmission may be performed by adjusting the difference between the TA values to be the threshold or less.

Referring to FIG. 12, a difference between a first TA value for a first serving cell 1210 and a second TA value for a second serving cell 1220 may be the threshold or greater.

Likewise, whether the difference between the TA values for the plurality of serving cells is the threshold or greater may be determined based on a TA value for a particular serving cell (reference TA value). According to the embodiment of the present invention, it may be determined whether a difference between the reference TA value and a TA value for another serving cell carrier-aggregated with the particular serving cell is the threshold or greater. When the difference between the reference TA value and the TA value for the other serving cell is the threshold or greater, the UE may perform UL transmission through the other serving cell based on an adjusted TA value by adjusting the TA value for the other serving cell. The adjusted TA value may be determined such that a difference between the reference TA value and the adjusted second TA value is the threshold or less.

The serving cell for determining the reference TA value may be a predetermined serving cell (for example, a PCC). Alternatively, the serving cell for determining the reference TA value may be set through a high-layer signal, such as RRC signaling.

Referring to FIG. 12, a first TA value for the first serving cell 1210 may be set as the reference TA value and a difference between the reference TA value and a second TA value for the second serving cell 1220 may be the threshold or greater. In this case, the second TA value for the second serving cell 1220 may be adjusted to an adjusted second TA value. The adjusted second TA value may be determined such that a difference between the reference TA value and the changed second TA value is the threshold or less.

Figure 13:
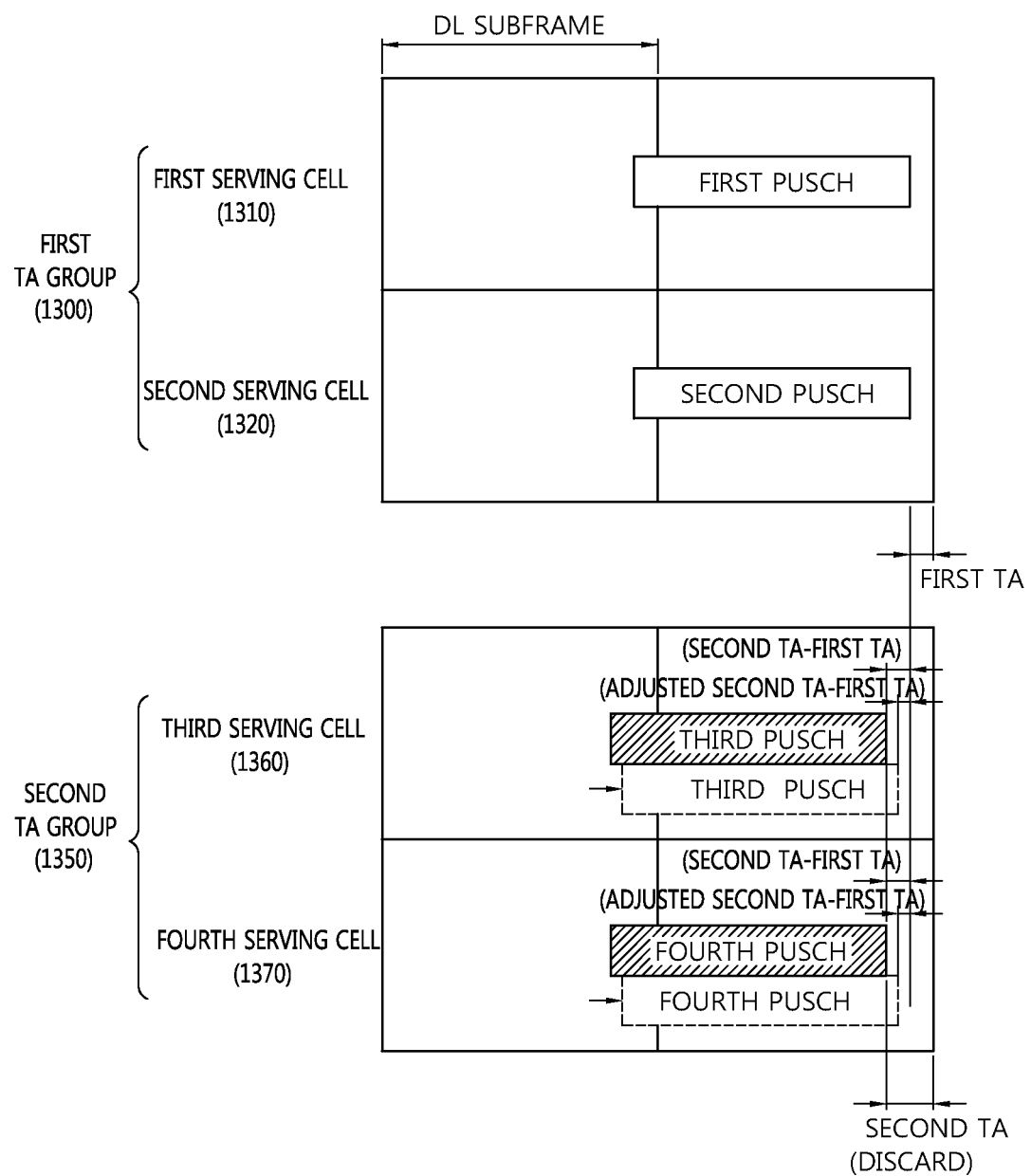
FIG. 13 is a schematic view illustrating an uplink transmission method according to an embodiment of the present invention.

FIG. 13 is a schematic view illustrating an uplink transmission method according to an embodiment of the present invention.

FIG. 13 illustrates a method of performing UL transmission by adjusting a TA value for a particular TA such that a TA value difference is a threshold or less when a plurality of serving cells is classified into different TA groups and the difference between the TA values for the TA groups is the threshold or greater.

Referring to FIG. 13, a first serving cell component 1310 and a second serving cell 1320 may be classified into a first TA group 1300, and a third serving cell 1330 and a fourth serving cell 1340 may be classified into a second TA group 1350. The same TA group may be a group with a TA determined based on the same TAC. A TA for the first TA group 1300 may be set as a first TA value and a TA for the second TA group 1350 may be set as a second TA value.

Whether the difference between the TA values for the plurality of TA groups is the threshold or greater may be determined based on a TA value for a particular TA group (reference TA value). According to the embodiment of the present invention, it may be determined whether a difference between the reference TA value and a TA value for another TA group carrier-aggregated with the particular TA group is the threshold or greater. When the difference between the reference TA value and the TA value for the other TA group is the threshold or greater, UL transmission may be performed through a serving cell corresponding to the other TA group based on an adjusted TA value by adjusting the TA value for the other TA group. The adjusted TA value may be determined such that a difference between the reference TA value and the adjusted second TA value is the threshold or less.

The TA group for determining the reference TA value may be a TA group including a predetermined serving cell (for example, a PCC). Alternatively, the TA group for determining the reference TA value may be set through a high-layer signal, such as RRC signaling.

Referring to FIG. 13, the first TA value for the first TA group 1300 may be set as the reference TA value and it may be determined whether a difference between the reference TA value and the second TA value for the second TA group 1350 is a threshold or greater. When the difference between the first TA value as the reference TA value and the second TA value is the threshold or greater, the second TA value for the serving cells included in the second TA group 1350, the third serving cell 1360 and the fourth serving cell 1370, may be adjusted to an adjusted second TA value. The UE may transmit UL data (for example, third PUSCH data and fourth PUSCH data) through the third serving cell 1160 and the fourth serving cell 1370 based on the adjusted second TA value.

Figure 14:
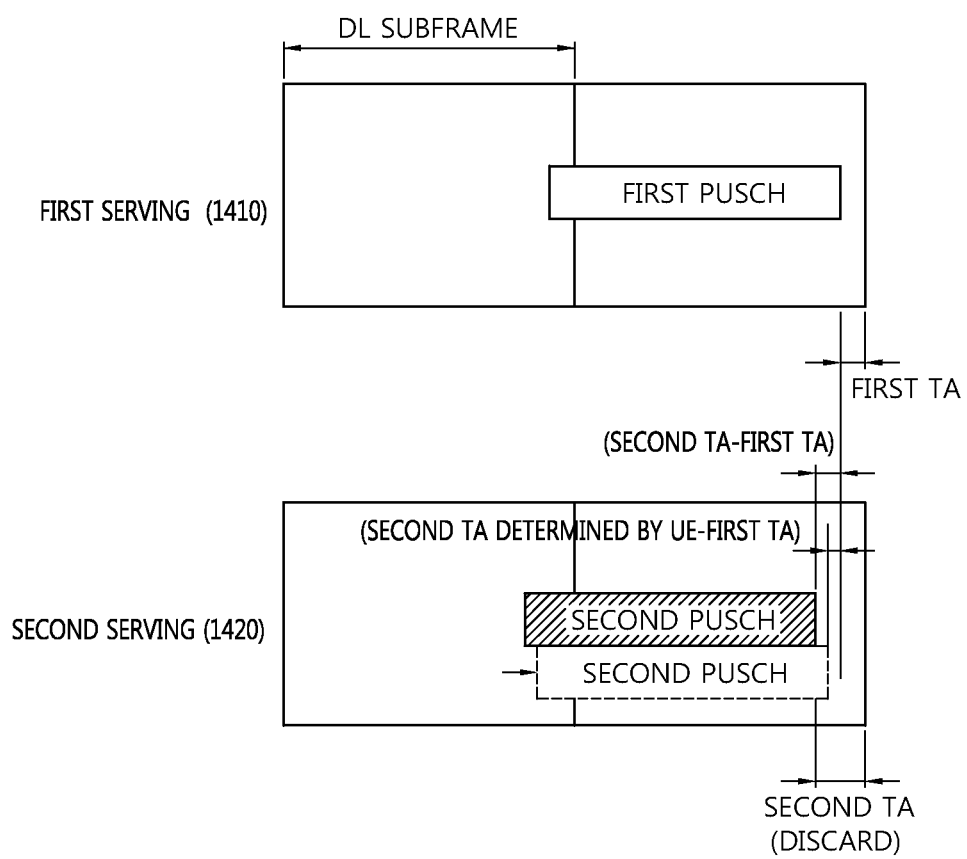
FIG. 14 is a schematic view illustrating an uplink transmission method according to an embodiment of the present invention

FIG. 14 is a schematic view illustrating an uplink transmission method according to an embodiment of the present invention.

In FIG. 14, when a difference between TA values for a plurality of carrier components is a threshold or greater, a TAC transmitted from the base station may be neglected.

Likewise, whether a difference between TA values for a plurality of serving cells is the threshold or greater may be determined based on a TA value for a particular serving cell (reference TA value). According to the embodiment of the present invention, it may be determined whether a difference between the reference TA value and a TA value for another serving cell carrier-aggregated with the particular serving cell is the threshold or greater. When the difference between the reference TA value and the TA value for the other serving cell is the threshold or greater, the UE may neglect the TAC received from the base station. The UE may perform UL transmission based on a random TA value without determining the TA value for the other serving cell based on the received TAC. The random TA value may be expressed as a term "TA value determined by the UE."

The serving cell for determining the reference TA value may be a predetermined serving cell (for example, a PCC). Alternatively, the serving cell for determining the reference TA value may be set through a high-layer signal, such as RRC signaling.

Referring to FIG. 14, a first TA value for a first serving cell 1410 may be set as the reference TA value and a difference between the first TA value for the first serving cell 1410 and a second TA value for a second serving cell 1420 which are received from the base station may be the threshold or greater. In this case, the UE may neglect the TAC including information on the second TA value. The UE may perform UL transmission through the second serving cell 1420 using a TA value determined by the UE without considering the received second TA value. The TA value determined by the UE may be a TA value used by the UE in previous UL transmission or be a value adjusted to have a difference from the first TA value within the range of the threshold as in FIGS. 12 and 13.

Figure 15:
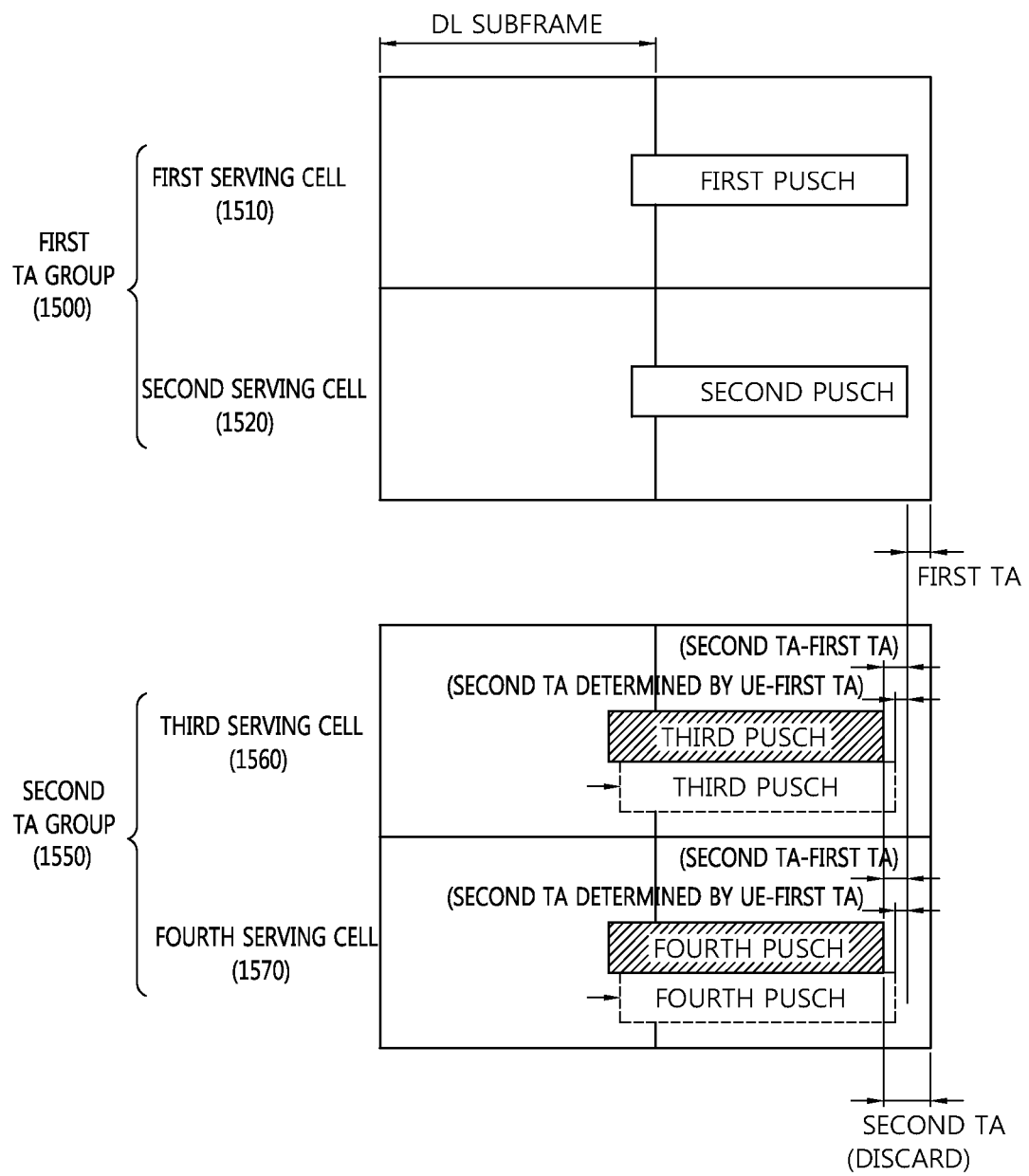
FIG. 15 is a schematic view illustrating an uplink transmission method according to an embodiment of the present invention.

FIG. 15 is a schematic view illustrating an uplink transmission method according to an embodiment of the present invention.

FIG. 15 illustrates a method of performing UL transmission by adjusting a TA value for a particular TA such that a TA value difference is a threshold or less when a plurality of serving cells is classified into different TA groups and the difference between the TA values for the TA groups is the threshold or greater.

Referring to FIG. 15, a first serving cell component 1510 and a second serving cell 1520 may be classified into a first TA group 1500, and a third serving cell 1530 and a fourth serving cell 1540 may be classified into a second TA group 1550. The same TA group may be a group with a TA determined based on the same TAC. A TA for the first TA group 1500 may be a first TA value and a TA for the second TA group 1550 may be a second TA value.

Whether the difference between the TA values for the plurality of TA groups is the threshold or greater may be determined based on a TA value for a particular TA group (reference TA value). According to the embodiment of the present invention, it may be determined whether a difference between the reference TA value and a TA value for another TA group carrier-aggregated with the particular TA group is the threshold or greater. When the difference between the reference TA value and the TA value for the other TA group is the threshold or greater, a TAC including information on the TA value for the other TA group may be neglected. The UE may perform UL transmission based on a TA value determined by the UE.

The TA group for determining the reference TA value may be a TA group including a predetermined serving cell (for example, a PCC). Alternatively, the TA group for determining the reference TA value may be set through a high-layer signal, such as RRC signaling.

Referring to FIG. 15, the first TA value for the first TA group 1500 may be set as the reference TA value and it may be determined whether a difference between the reference TA value and the second TA value for the second TA group 1550 is a threshold or greater. When the difference between the first TA value as the reference TA value and the second TA value is the threshold or greater, the UE may neglect a TAC including information on the second TA value. The UE may perform UL transmission through the serving cells in the second TA group 1550 (the third serving cell 1560 and the fourth serving cell 1570) using the TA value determined by the UE without considering the received second TA value. The TA value determined by the UE may be a TA value used by the UE in previous UL transmission or be a value adjusted to have a difference from the first TA value within the range of the threshold as in FIGS. 12 and 13.

Figure 16:
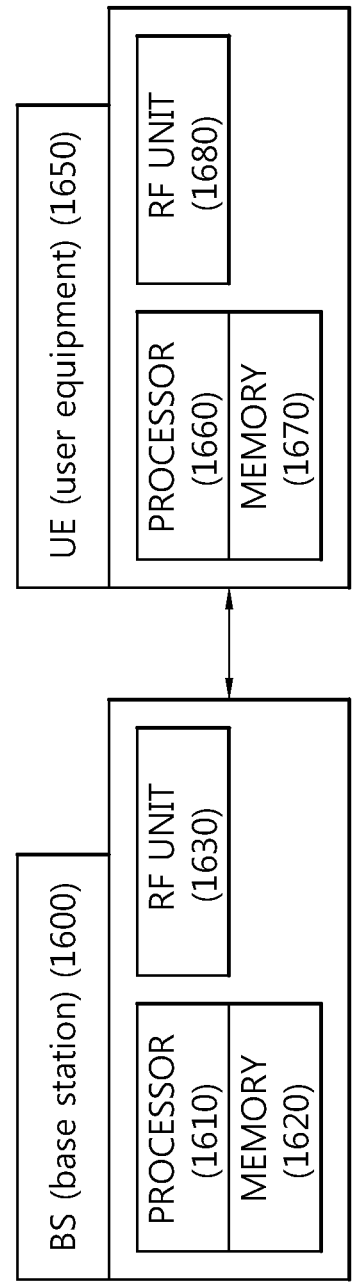
FIG. 16 is a block diagram illustrating a wireless communication system according to an embodiment of the present specification.

FIG. 16 is a block diagram showing a wireless communication system according to an embodiment of the present invention.

Referring to FIG. 16, a BS 1600 includes a processor 1610, a memory 1620 and a RF unit 1630. The memory 1620 is connected to the processor 1610 and configured to store various information used for the operations for the processor 2010. The RF unit 2030 is connected to the processor 1610 and configured to transmit and/or receive a radio signal. The processor 1610 implements the proposed functions, processed, and/or methods. In the described embodiments, the operation of BS may be implemented by the processor 1610.

For example, the processor 1610 may be configured to transmit a TAC for determining a timing of an uplink subframe to the UE.

A wireless apparatus 1650 includes a processor 1660, a memory 1670, and a radio frequency (RF) unit 1680. The memory 1670 is connected to the processor 1660 and configured to store various information used for operating the processor 1660. The RF unit 1680 is connected to the processor 1660 and configured to transmit and/or receive a radio signal. The processor 1660 implements the proposed functions, processed, and/or methods. In the embodiments described above, the operation of the wireless apparatus may be implemented by the processor 1660.

For example, the processor 1660 may be configured to receive a first TAC for a first serving cell and a second TAC for a second serving cell and to determine whether to transmit uplink data through the second serving cell based on whether a timing difference is a threshold or less. Here, the timing difference may be acquired based on the first TAC and the second TAC and the first serving cell may be configured to always perform uplink transmission regardless of the timing difference.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for uplink transmission using a plurality of serving cells, the method performed by a user equipment (UE) and comprising:

receiving a primary timing advance command for a primary cell (PCell) and a secondary timing advance command for a secondary cell (SCell); and determining whether to transmit uplink data on the SCell based on a timing difference between the PCell and the SCell, wherein the timing difference between the PCell and the SCell is determined based on the primary timing advance command and the secondary timing advance command; and performing the uplink transmission based on the determination, wherein, if the timing difference between the PCell and the SCell exceeds a threshold value, the UE does not perform the uplink transmission on the SCell.

2. The method of claim 1, wherein, if the timing difference between the PCell and the SCell does not exceed the threshold value, the UE performs the uplink transmission on the SCell.

3. The method of claim 2, wherein the UE always performs the uplink transmission on the PCell regardless of the timing difference.

4. The method of claim 1, wherein the timing difference is determined further based on a subframe boundary timing of a first downlink subframe transmitted through the Pcell and a subframe boundary timing of a second downlink subframe transmitted through the Scell.

5. The method of claim 1, wherein the primary timing advance command is information for a primary timing advance group, and the secondary timing advance information is information for a secondary timing advance group.

6. A user equipment (UE) comprising:
   a radio frequency (RF) unit configured to transmit and receive a radio signal; and
   a processor operatively connected with the RF unit and configured to:
      receive a primary timing advance command for a primary cell (PCell) and a secondary timing advance command for a secondary cell (SCell); and
      determine whether to transmit uplink data on the SCell based on a timing difference between the PCell and the SCell,
      wherein the timing difference between the PCell and the SCell is determined based on the primary timing advance command and the secondary timing advance command; and
      perform the uplink transmission based on the determination,
      wherein, if the timing difference between the PCell and the SCell exceeds a threshold value, the UE does not perform the uplink transmission on the SCell.

7. The UE of claim 6, wherein, if the timing difference between the PCell and the SCell does not exceed the threshold value, the UE performs the uplink transmission on the SCell.

8. The UE of claim 7, wherein the UE always performs the uplink transmission on the PCell regardless of the timing difference.

9. The UE of claim 6, wherein the primary timing advance command is information for a primary timing advance group, and the secondary timing advance command is information for a secondary timing advance group.

10. The UE of claim 6, wherein the timing difference is determined further based on a subframe boundary timing of a first downlink subframe transmitted through the PCell and a subframe boundary timing of a second downlink subframe transmitted through the SCell.

* * * * *